June 13, 1967  UENO HIROMITSU  3,325,117
VARIABLE SPEED FISHING REEL WITH FRICTION CLUTCH
Filed Jan. 14, 1964  2 Sheets-Sheet 2
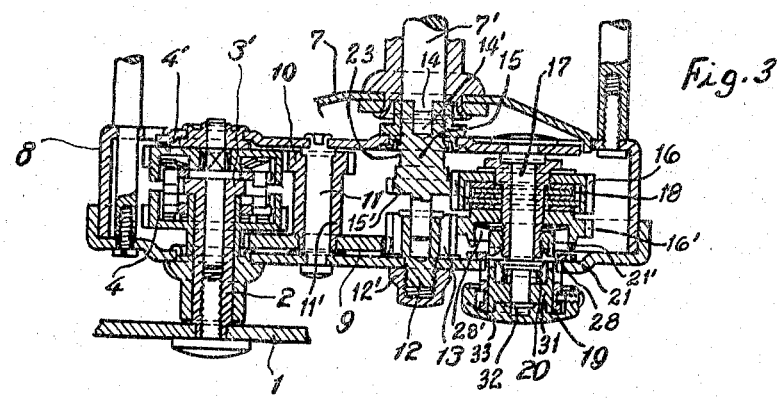
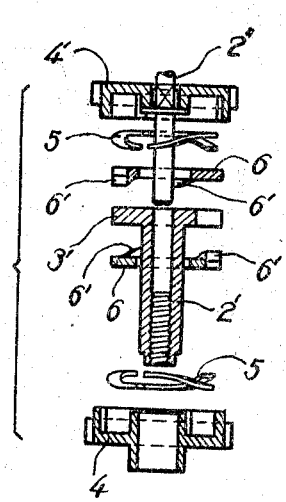
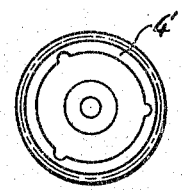
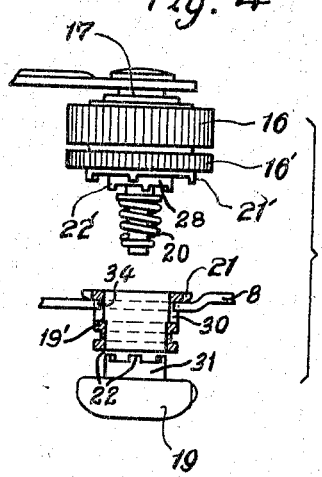
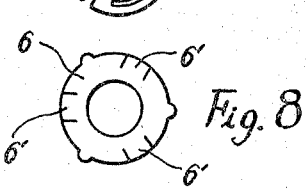
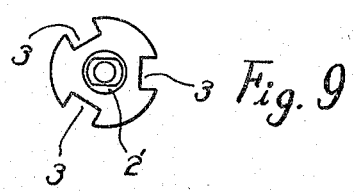
INVENTOR.
UENO HIROMITSU

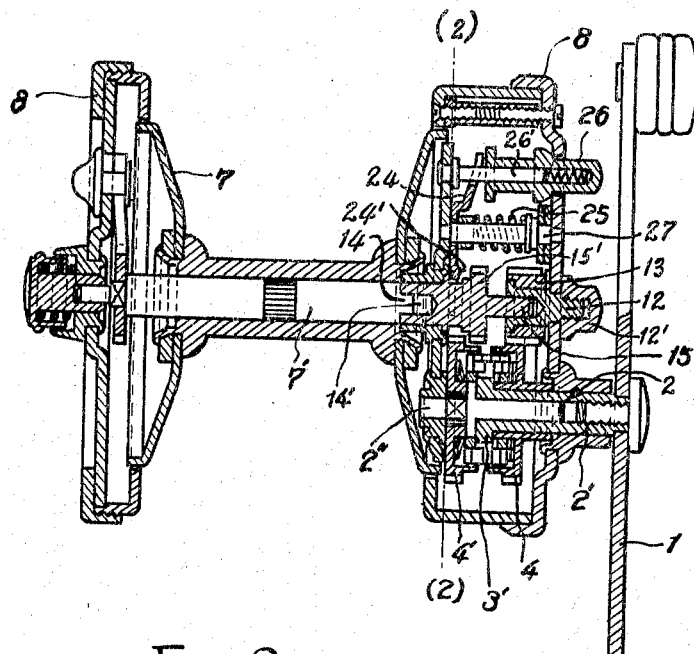
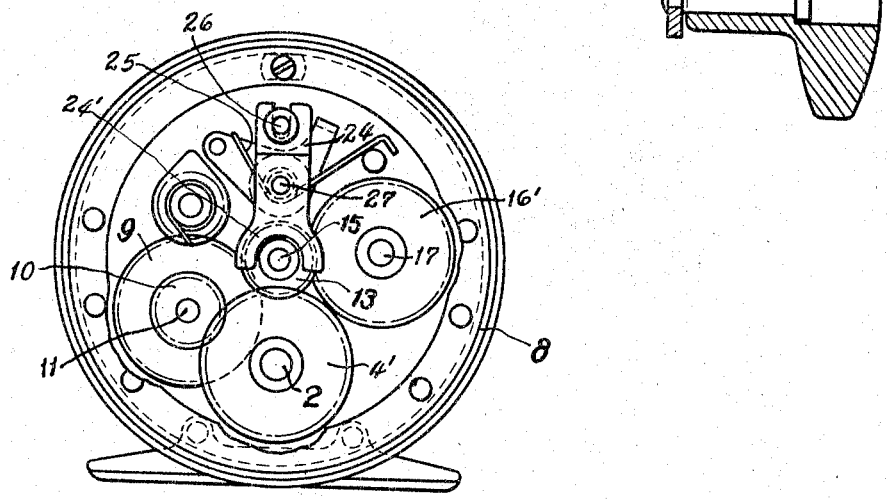

United States Patent Office 3,325,117
Patented June 13, 1967

3,325,117
VARIABLE SPEED FISHING REEL WITH FRICTION CLUTCH
Ueno Hiromitsu, Tokyo-to, Japan, assignor to Olympic Fishing Tackle Co., Tokyo-to, Japan
Filed Jan. 14, 1964, Ser. No. 337,580
Claims priority, application Japan, Jan. 21, 1963, 38/2,389
5 Claims. (Cl. 242—84.54)

This invention relates to fishing reels and, more particularly, to a novel and improved fishing reel including selectively adjustable resistance regulating means for a bobbin, novel speed selecting means interposed between the drive handle and the bobbin and a selectively operable clutch interposed between the bobbin and the drive handle.

An object of the present invention is to provide a fishing reel including a handle secured to a handle shaft, and with a pair of drive gears on the handle shaft each effectively coupled to the handle shaft upon rotation thereof in respective opposed directions.

Another object is to provide a fishing reel of this type including novel resistance regulator means coupled to the bobbin and including selectively operable resistance adjustment means.

A further object of the invention is to provide such a resistance regulating means including friction means interposed between a pair of gears respectively coupled to a gear train, and novel selectively operable means for varying the effective resistance of the resistance regulating means.

Still another object of the invention is to provide a fishing reel in accordance with the above mentioned objects and which further includes a selectively operable clutch for unclutching the bobbin from a speed change gearing.

These and other objects, advantages and novel features of the invention will be apparent from the following description and the accompanying drawings illustrating a specific but not limiting embodiment of the invention.

In the drawings:
FIG. 1 is a vertical sectional view of a fishing rod embodying the invention;
FIG. 2 is a view taken on the line 2—2 of FIG. 2;
FIG. 3 is an expanded sectional view through the fishing reel;
FIG. 4 is an exploded view of the resistance regulating means and the selectively operable adjustment means therefor;
FIG. 5 is an exploded view of the drive shaft turned by the handle and the drive gears associated with said drive shaft;
FIG. 6 is an elevation view of one of the drive gears;
FIG. 7 is an elevation view of a spring associated with the drive gears shown in FIG. 6;
FIG. 8 is an elevation view of an element of a one-way clutch device including the spring of FIG. 7; and
FIG. 9 is an end elevation view of the drive shaft.

Referring to the drawings, an operating handle 1 is secured to a two-part drive shaft 2 including a tubular section 2' and a section 2" rotatably telescoped and engaged in tubular section 2'. Tubular drive shaft section 2' has a substantially circular flange 3' preferably integral with its inner end and formed with uniformly spaced peripheral notches 3, shown (FIG. 9) as three (3) in number although more may be used.

A pair of drive gears 4 and 4' are mounted on shaft portions 2' and 2", respectively, and are freely rotatable thereon. Each of the drive gears 4 and 4' has operatively associated therewith, as by being mounted in an annular recess in the face of the drive gear (see FIG. 5), a spring 5, and each spring is engaged with a respective clutch element 6 which is likewise received in an axially displaceable manner in such annular recess and is rotatable with respect to the drive shaft 2. Each clutch element 6 has teeth or projections 6' on one face thereof and these clutch elements 6 are disposed on opposite sides of the flange 3'. The teeth 6' on the respective clutch elements face in opposite angular directions and are engageable with the recesses 3 in the flange 3'. These clutch teeth 6' are so shaped that, in one direction of rotation of shaft 2, the teeth 6' will have driving engagement in the recess 3 of the flange 3' but, in the opposite direction of rotation, the teeth 6' will slide out of the recesses 3 so that the gear coupled to the part 6 by the spring 5 and interfitting formations on the gear and on the part 6, as is best seen in FIGS. 6 and 8, will not be rotated. Thus, one gear 4 is rotated only upon one direction of rotation of shaft 2, and the other gear 4' is rotated only during the opposite direction of rotation of shaft 2.

There is a bobbin, generally indicated at 7, mounted between the side members 8 of the reel frame. Bobbin 7 is rotatable in the frame as illustrated, particularly in FIGS. 1 and 3, and is arranged to be driven by either of a pair of gear trains included in coupling means, including speed change gearing, connecting drive gears 4 and 4' to the bobbin. This speed change gearing includes a pair of gear trains, each having respectively different output speeds, one gear train being a high speed gear train and the other gear train being a low speed gear train.

For this purpose, a shaft 11 is mounted in the frame 8, as shown in FIG. 3, in spaced parallel relation to drive shaft 2, and shaft 11 has a tubular sleeve 11' thereon which, at one end, is formed as a gear 10 meshing with the gear 4'. The opposite end of the sleeve 11' mounted on shaft 11 is reduced in cross section and has a relatively large diameter gear 9 fixed thereon. A gear 13 is rotatable on a tubular portion of a shaft 12 having a threaded outer end and secured in frame 8 by a nut 12'. Shaft 12 extends in spaced parallel relation to shafts 2 and 11, and gear 13 is engaged directly by the main drive gear 4 (FIG. 1). Gear 13 is held against axial displacement between a wall of frame 8 and a flange on the inner end of shaft 12. The other main drive gear 4' is coupled to gear 13 through the gears 10 and 9, with the gear 9 meshing with the gear 13. Gear 13 is arranged to rotate bobbin 7 through a disengageable clutch arrangement.

For this purpose, the bobbin 7 includes a shaft 7' having a polygonal extension 14 which is slidably but non-rotatably engaged in a mating recess 14' in a clutch shaft 15 carrying a gear 15' which is coupled to rotate with the gear 13. Clutch shaft 15 is axially displaceable in a manner described hereinafter, so that the polygonal extension 14 may be selectively disengaged from the polygonal recess 14' in shaft 15 to provide for free rotation of bobbin 7. Shaft 15 has a reduced diameter end or extension slidably and rotatably supported within the tubular portion of shaft 12.

Gears 13 and 15' are of the same diameter and are coaxial, and these gears are engaged with gears 16' and 16, respectively, forming part of the resistance regulating means. These gears 16 and 16' are rotatably mounted on a shaft 17 in the frame 8, shaft 17 being in spaced parallel relation to the other shafts previously mentioned. Disposed between the gears 16 and 16', each of which is in constant mesh with gear 15 or gear 13, respectively, is a friction resistance regulating means indicated generally at 18 as comprising friction plates or disks. By adjusting the pressure of the regulating means 18, the effective resistance to rotation of bobbin 7 may be regulated.

For this purpose, the gear 16 is rotatably mounted relative to sleeve 17' while gear 16' is rotatably fixed to sleeve 17' which is telescoped over the shaft 17 and includes a threaded portion. A nut 28 is threadably engaged with this threaded portion of sleeve 17', and a suitable spring is interposed between nut 28 and gear 16'.

The selectively operable resistance adjusting means includes an externally accessible knob 19 having a hub 31 fixed thereto and formed with teeth 22 which are circumferentially spaced and extend parallel to the axis of knob 19. This hub fits within a sleeve 19' which is co-axial therewith and which has, on its inner end, a plurality of radially extending teeth 21 which are circumferentially spaced. The teeth 21 are interengageable with teeth 21' extending axially from a face of gear 16', and the teeth 22 are interengageable with teeth 22' extending axially from a face of nut 28. A spring 20 normally biases knob 19 outwardly so that the respective teeth 21 and 22 are disengaged from the cooperating teeth 21' and 22'. The sleeve 19' carrying the teeth 21 is formed with longitudinal slots 30 in which are engaged teeth 34 projecting inwardly from the periphery of an aperture in a side frame member 8, thereby anchoring sleeve 19' against relative rotation while providing for axial displacement thereof.

Hub 31 is restrained against outward movement on shaft 17 by an enlarged flange or head 32 on shaft 17, knob 19 seating in a recess in the outer face of hub 31 and having a skirt 33 surrounding hub 31 and forming therewith an annular recess seating sleeve 19'.

When knob 19 is moved inwardly against the force of spring 20, teeth 21 are engaged between teeth 21' and teeth 22 are engaged between teeth 22'. Thus, gear 16' and the other gears coupled thereto are held against rotation. Rotation of knob 19 will then adjust nut 28 along the threaded portion of the sleeve on shaft 17 to adjust the effective compression on the regulating means 18.

To disengage bobbin 7 for free rotation, there is provided a suitable clutch operating means which may be operated by pressing a button 26 (FIG. 1) which is spring biased in an outward direction. Button 26 is slidable along a pin 26', mounted in frame 8, extending parallel to a shaft 27, which is also mounted in frame 8 parallel to the axis of gears 13 and 15. The inner end of the button 26 engages one forked end of a clutch operating lever 24. The bent operating lever 24 has an aperture (FIGS. 1 and 2) freely engaged over the pin 27, and a spring 25 biases lever 24 against a frame part. The lever 24 has an opposite forked end 24' which engages in a circumferential recess in the clutch shaft 15. When button 26 is pushed inwardly, lever 24 is rocked to move clutch shaft 15 to the right as viewed in FIG. 1, to disengage projection 14 from recess 14', thereby permitting free rotation of bobbin 7. Spring 25 normally bases lever 24 to the clutch engaging position, and acts as pivot for lever 24 when the latter is operated by pushing button 26.

While a specific embodiment of the invention has been shown and described in detail to illustrate the application of the principles of the invention, it will be understood that the invention may be embodied otherwise without departing from such principles.

What is claimed is:

1. A fishing reel, comprising, in combination, a frame; a bobbin rotatably mounted in said frame; a drive shaft rotatably mounted in said frame; an operating handle secured to said drive shaft; a pair of drive gears rotatably mounted on said drive shaft; a pair of one-way clutch devices each operatively interposed between a respective drive gear and said drive shaft, each device coupling its associated drive gear to said drive shaft upon rotation of said drive shaft in a respective one of two opposite directions; coupling means, including speed change gearing, connecting said drive gears to said bobbin to rotate the latter responsive to rotation of said drive shaft, said gearing including a pair of gear trains having respective different output speeds; resistance regulating means coupled to said bobbin and interposed between a pair of components of said speed change gearing; and selectively operable resistance adjustment means operatively associated with said regulating means.

2. A fishing reel, as claimed in claim 1, including output gear means coupled to said bobbin; one of said drive gears meshing directly with said output gear means and the other of said drive gears being coupled to said output gear means through a speed reduction gearing.

3. A fishing reel, comprising, in combination, a frame; a bobbin rotatably mounted in said frame; a drive shaft rotatably mounted in said frame; an operating handle secured to said drive shaft; a pair of drive gears rotatably mounted on said drive shaft; a pair of one-way clutch devices each operatively interposed between a respective drive gear and said drive shaft, each device coupling its associated drive gear to said drive shaft upon rotation of said drive shaft in a respective one of two opposite directions; coupling means, including speed change gearing, connecting said drive gears to said bobbin to rotate the latter responsive to rotation of said drive shaft, said gearing including a pair of gear trains having respective different output speeds; resistance regulating means coupled to said bobbin and including selectively operable resistance adjustment means; said resistance regulating means including a pair of co-axially arranged idler gears; each of said idler gears being continuously coupled to said output gear means; said resistance regulating means including friction plates interposed between said idler gears; and means operable to adjust the axial spacing of said idler gears to adjust the effective force of said friction plates.

4. A fishing reel, as claimed in claim 3, in which said output gear means includes a pair of axially spaced co-axial gears which are coupled for independent rotation and which are axially displaceable relative to each other; one of said idler gears meshing with one of said output gears and the other of said idler gears meshing with the other of said output gears; a shaft rotatably mounting said idler gears and having a threaded portion; a nut threaded on said threaded portion; said selectively operable resistance adjusting means including a manually operable knob; said knob including first coupling means selectively engageable with one of said idler gears and second coupling means selectively engageable with said nut, said first coupling means being fixed against rotation; said knob being axially displaceable to engage said first and second coupling means with said last-named one idler gear and said nut, respectively, whereby, upon rotation of said knob said second coupling means will adjust said nut along said threaded portion while restraining movement of said idler gears.

5. A fishing reel, as claimed in claim 4, including spring means biasing said knob axially in a direction to disengage said coupling elements.

References Cited

UNITED STATES PATENTS

| 1,991,756 | 2/1935 | Lazick | 74—812 |
| 2,150,088 | 3/1939 | White. | |
| 2,553,200 | 5/1951 | Mandolf et al. | 242—84.46 |
| 2,670,826 | 3/1954 | Sussdorff et al. | 192—48 |

FOREIGN PATENTS

| 1,199,431 | 6/1959 | France. |
| 613,885 | 12/1948 | Great Britain. |

FRANK J. COHEN, *Primary Examiner.*

MERVIN STEIN, *Examiner.*

B. S. TAYLOR, *Assistant Examiner.*